United States Patent [19]

Lapke et al.

[11] 4,026,197

[45] May 31, 1977

[54] OIL COOLED PISTON RINGS

[75] Inventors: Robert A. Lapke; Bernard G. Richards, both of Peoria, Ill.

[73] Assignee: Caterpillar Tractor Co., Peoria, Ill.

[22] Filed: June 2, 1975

[21] Appl. No.: 583,239

[52] U.S. Cl. .................... 92/186; 277/22
[51] Int. Cl.² .......................................... F01P 3/10
[58] Field of Search ............ 92/186, 182, 157, 160, 92/86.5; 277/75, 78, 79, 215, 22, 34.3, 15, 34.6, 201, 226; 123/41.38, 41.34, 41.39

[56] References Cited

UNITED STATES PATENTS

| 522,459 | 7/1894 | Ellis | 277/201 X |
|---|---|---|---|
| 2,386,117 | 10/1945 | Hvid | 92/186 X |
| 2,554,234 | 5/1951 | Baudry et al. | 277/15 |
| 2,832,618 | 4/1958 | Knoll et al. | 277/34.3 |
| 3,204,617 | 9/1965 | Hulbert | 92/186 X |
| 3,272,092 | 9/1966 | Vielmo et al. | 92/157 |
| 3,296,943 | 1/1967 | Rosman | 277/22 X |
| 3,761,102 | 9/1973 | Nicholson | 277/236 X |
| 3,843,138 | 10/1974 | Cobb | 277/22 |

FOREIGN PATENTS OR APPLICATIONS

| 688,305 | 6/1964 | Canada | 277/79 |
|---|---|---|---|
| 1,401,401 | 10/1968 | Germany | 418/92 |
| 911,997 | 12/1962 | United Kingdom | 277/72 |
| 151,225 | 9/1920 | United Kingdom | 277/215 |
| 957,400 | 5/1964 | United Kingdom | 277/215 |

*Primary Examiner*—Irwin C. Cohen
*Attorney, Agent, or Firm*—Wegner, Stellman, McCord, Wiles & Wood

[57] ABSTRACT

An improved reciprocating engine wherein the pistons are provided with hollow compression rings having a fluid inlet and a fluid outlet and an elongated fluid flow path extending therebetween. A path is established through various parts of the engine including the piston for directing a coolant, usually oil, through the inlet to the interior of the piston ring to cool the ring during engine operation.

6 Claims, 5 Drawing Figures

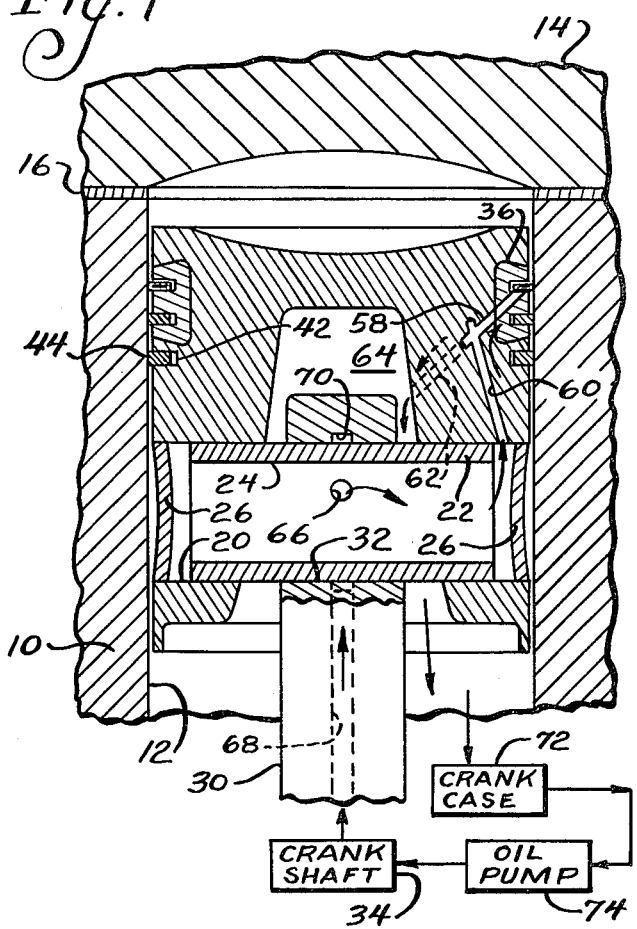
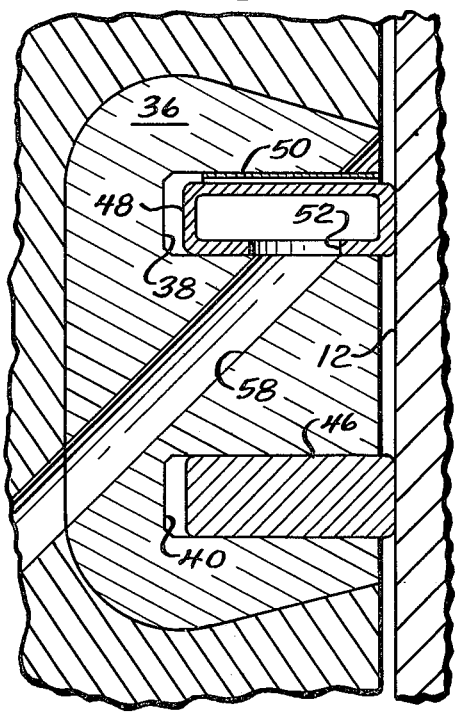
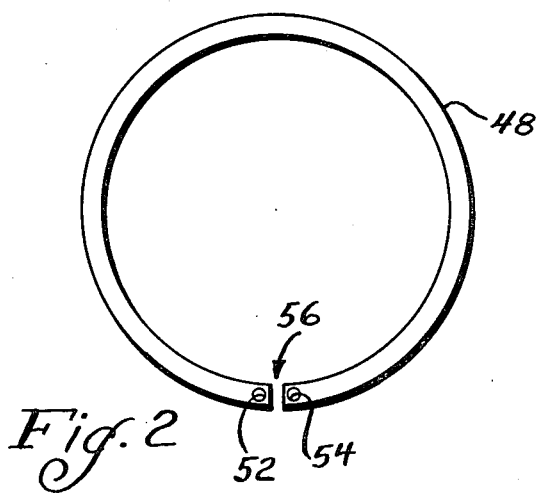
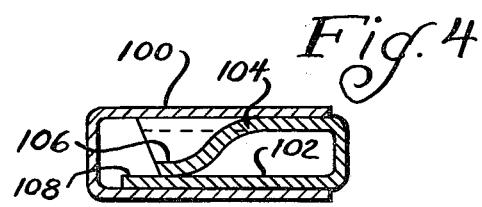
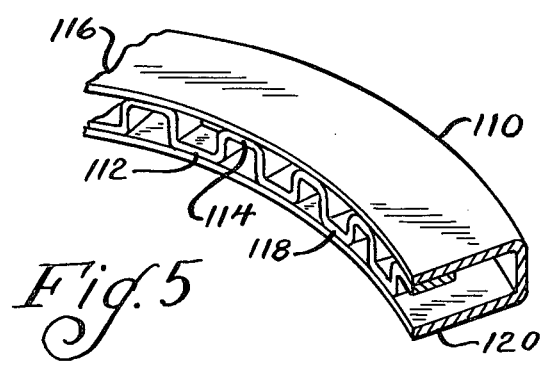

OIL COOLED PISTON RINGS

BACKGROUND OF THE INVENTION

This invention relates to reciprocating engines and, more specifically, to improved compression seals, i.e., piston rings, employed in such engines.

In various types of reciprocating engines, there frequently arises a need for the cooling of compression seals, i.e., piston rings, to preclude the same from operating at such high temperatures that the viscosity of lubricating oil would be decreased to the point where scuffing would occur. In other words, where piston rings, during the operation of a reciprocating engine, attain undesirably high temperatures, the lubricating oil film thickness is decreased rendering lubrication inadequate.

Heretofore, where piston rings have required cooling, it has been accomplished by cooling the piston carrying the ring, cooling the cylinder against which the ring bears, or both. This approach is undesirable in that it can easily result in overcooling the engine, thereby increasing the rate of heat rejection to the coolant. As a consequence, less energy can be converted to useful work and a larger radiator is required. Moreover, the approach leads only to marginal cooling of the ring itself.

SUMMARY OF THE INVENTION

It is the principal object of the invention to provide a new and improved reciprocating engine. More specifically, it is an object of the invention to provide such an engine with improved means for cooling compression seals.

The exemplary embodiment of the invention achieves the foregoing object in a reciprocating engine including a cylinder having a piston mounted for reciprocating therein. A piston ring is carried by the piston and is in sealing engagement with the cylinder. The piston ring hollow to define an elongated fluid flow path and includes an inlet and an outlet spaced along the flow path. Means are provided for directing a coolant through the inlet into the flow path to cool the ring during engine operation.

In general, the coolant employed may be lubricating oil and is directed to the ring by a conduit within the piston itself. The conduit may be provided with oil directed through the hollow center of the wrist pin mounting the piston. The wrist pin, in turn, includes an exteriorly opening port in fluid communication with a conduit in the connecting rod. The connecting rod conduit may be provided with lubricating oil from the crank shaft journal in conventional fashion.

The piston is also provided with a conduit aligned with the outlet and opening on an exterior surface of the piston so that the coolant may be returned to the lubricating oil reservoir.

According to a highly preferred embodiment, the ring includes a reinforcing matrix within the ring for precluding collapse of the ring under high operating pressures. According to one embodiment, the reinforcing matrix comprises an undulating strip sandwiched by opposite walls of the ring, the strip being separate from the ring. Accordingly to a second embodiment, the ring is defined by two opposed, telescoped, complementary, U-shaped members with an undulating configuration being provided by one leg of the innermost one of the U-shaped members.

Other objects and advantages will become apparent from the following specification taken in connection with the accompanying drawings.

DESCRIPTION OF THE DRAWINGS

FIG. 1 is a fragmentary, sectional view of a reciprocating engine embodying the invention;

FIG. 2 is a plan view of a piston ring made according to the invention;

FIG. 3 is an enlarged, fragmentary, sectional view of a portion of the invention;

FIG. 4 is a sectional view of one form of a piston ring whic may be employed in the invention; and FIG. 5 is a fragmentary, perspective view of another form of piston ring.

DESCRIPTION OF THE PREFERRED EMBODIMENTS

An exemplary embodiment of a reciprocating engine made according to the invention is illustrated in FIG. 1 and is seen to include a block 10 having an interior bore 12 to define a cylinder. The engine includes a head 14 secured to the block 10 by any suitable means (not shown) and a gasket 16 is conventionally interposed between the block 10 and the head 14.

Within the cylinder 12, there is disposed a piston 18. The piston 18 includes a bore 20 for receipt of a wrist pin 22 having a hollow center 24, as is conventional. The wrist pin 22 has a length somewhat less than the diameter of the piston 18 and, for purposes to be seen, plugs 26 are disposed within the bore 20 at opposite ends thereof to sealingly close the same at opposite sides of the wrist pin 22.

A connecting rod 30 includes a bore 32 whereby the same is journalled on the wrist pin 22. The connecting rod 30 is connected in the conventional fashion to a crank shaft, shown only schematically at 34.

Near the upper end of the piston 18, the same is provided with a ring belt insert 36, as is well known. The ring belt insert 36, as best seen in FIG. 3, is provided with first and second peripheral, radially outwardly opening grooves 38 and 40 for receipt of compression seals, that is, piston rings.

Below the ring belt insert 36, the piston 18 may be provided with a further peripheral groove 42 for receipt of a conventional oil ring 44.

With reference to FIG. 3, the lowermost one of the compression ring receiving grooves, namely the groove 40, is provided with a conventional compression ring 46, while the upper groove 38 is provided with a hollow compression ring 48. Both the rings 46 and 48 are in sealing engagement with the cylinder 12. Either, or both, of the rings 46 and 48 may be subject to downward biasing by an undulating biasing spring 50 as desired.

The ring 48 is, as mentioned, hollow so as to define an elongated, peripheral fluid flow path. As seen in FIG. 3, the undersurface of the ring 48 is provided with an inlet 52, while as seen in FIG. 2, at an opposite end of the flow path, the ring 48 is provided with an outlet 54. The ring 48 may be split as at 56 and the ends sealed adjacent the inlet and outlet 52 and 54, respectively.

As seen in FIGS. 1 and 2, a diagonally extending bore 58 extends through the ring belt insert 36 and a portion of the piston 18 to intersect with a generally upwardly directed bore 60. The lower end of the bore 60 opens into the wrist pin receiving bore 20 between an end of the wrist pin 22 and the adjacent plug 26. As a consequence, a fluid flow path from the interior of the wrist pin 22 to the groove 38 is established.

A further bore 62, generally parallel to the bore 58, extends through the ring belt insert 36 to a downwardly opening cavity 64 in the piston 18 provided for receipt of the upper end of the connecting rod 30.

The arrangement is such that the upper ends of the bores 58 and 60 open into the groove 38 to be aligned with the inlet 52 and the outlet 54 in the ring 48, respectively.

The wrist pin 22 is provided with a radially extending port 66 which opens to the exterior of the wrist pin 22. The connecting rod 30 is provided with an elongated fluid flow passage or conduit 68 which terminates in a circumferential port 70 in the bore 32 which is aligned with the port 66 in the wrist pin 22.

As a consequence of the foregoing construction, a coolant directed through the conduit 68 in the connecting rod will emerge from the port 70 to pass through the port 66 to the interior of the wrist pin 22. From the interior of the wrist pin 22, the fluid will flow through the conduits 60 and 58 to the inlet 52 of the ring 48. The fluid will then flow about the ring 48 to emerge from the outlet 54 into the conduit 62. Fluid emerging from the conduit 62 will then be directed to the conventional engine crank case, shown schematically at 72. The fluid will be a coolant for the purpose of cooling the ring 48. Conveniently, the fluid employed will be lubricating oil. Typically, the engine will include an oil pump 74 for receiving oil from the crank case 72 and, through conventional structure, for directing the same to the interior of the crank shaft 34 at the main bearing thereof. At each journal on the crank shaft 34, a radially extending port is provided to establish fluid communication to the conduit 68 in the connecting rod 30. Most multi-cylinder reciprocating engines in use today are provided with such lubricating oil conduits in their crank shaft along the radially extending ports to the bearings journalling the connecting rod to the crank shaft. Thus, an oil cooled compression ring made according to the invention can be relatively easily employed in reciprocating engines without materially increasing manufacturing efforts in the area of the crank shaft.

In some cases, particularly in diesel applications, compression ratios will be sufficiently high that care must be taken to preclude collapse of the hollow ring 48 under such pressures. Accordingly, the invention contemplates that a reinforcing matrix be located within the hollow ring 48. FIG. 4 illustrates one embodiment of such a reinforcing matrix. In the embodiment illustrated in FIG. 4, the hollow ring is defined by two, opposed, telescoped, complementary U-shaped members 100 and 102 which may be assembled in the relation illustrated in FIG. 4 by brazing or electron beam welding.

One of the legs 104 of the innermost U-shaped member 102, near its end, is stamped to provide an undulating configuration wherein, at desired intervals, portions 106 are depressed out of the plane of the leg 104 into engagement with the opposite leg 108 of the U-shaped member 102. As a consequence, the undulating figure configuraton provides top to bottom strength to the ring to resist collapse.

FIG. 5 illustrates an alternate means of providing a reinforcing matrix. The embodiment illustrated in FIG. 5 is also made up to two, opposed, complementary, telescoping, U-shaped members, only one of which, 110, is shown. A separate strip 112 is deformed into a square tooth pattern with raised teeth 114 in engagement with the leg 116 of the U-shaped member 110 and depressed portions 118 in engagement with the leg 120 of the U-shaped member 110. After installation of the strip 112, the second U-shaped member (not shown) may be assembled to the U-shaped member 110 in much the same way as the U-shaped member 100 is assembled on the U-shaped member 102.

While the illustrated embodiment employs porting to direct the coolant to the ring 48 through its bottom face, it is to be understood that, if desired, the coolant could be directed to the interior of the ring at its face marking its inner diameter. In such a case, separate seals for sealing the side faces of the ring against the sides of the ring receiving groove are required.

From the foregoing, it will be appreciated that the invention achieves the object set forth of cooling compression rings in reciprocating engines to prevent undesirable thinning of a lubricating oil film due to high operating temperatures. It will be appreciated that the cooling is accomplished without overcooling the piston or the cylinder, or both, thereby eliminating the undesirable side effects associated with such cooling.

We claim:

1. In a reciprocating engine, the combination comprising:
   a cylinder;
   a piston mounted for reciprocation in said cylinder;
   a piston ring carried by said piston and in sealing engagement with said cylinder, said piston ring being hollow to define an elongated peripheral fluid flow path therethrough and having an inlet and an outlet peripherally spaced along said flow path;
   means for directing a coolant through said inlet into said flow path to cool said ring during engine operation; and
   a reinforcing matrix within said piston ring for precluding collapse of the hollow of said ring under high pressure.

2. The reciprocating engine of claim 1 wherein said reinforcing matrix comprises an undulating strip having its opposite sides sandwiched by said alternately secured to opposite walls of said ring.

3. The reciprocating engine of claim 2 wherein said strip is separate from said ring.

4. The reciprocating engine of claim 2 wherein said ring is defined by two, opposed, telescoped, complementary, U-shaped members and wherein said undulating strip is defined by one leg of the innermost one of said U-shaped member.

5. In a reciprocating engine, the combination comprising: In a reciprocating engine, the combination comprising: a cylinder; a piston mounted for reciprocation in said cylinder; a peripheral compression ring receiving groove extending about said piston; a compression ring disposed in said groove to be carried by said piston and in sealing engagement with said cylinder, said piston ring including means defining an elongated peripheral fluid flow path about said groove and including an inlet and outlet peripherally spaced along said flow path; means for directing a coolant through said fluid flow path to cool said ring during engine operation, said directing means including a coolant conduit within said piston and opening into a side of said groove to connect with said ring inlet; and spring means biasing said compression ring against said side.

6. In a reciprocating engine, the combination comprising: a cylinder; a piston mounted for reciprocation in said cylinder, said piston including a peripheral compression ring receiving groove and a wrist pin receiving bore; a wrist pin within said bore, said wrist pin including a hollow center and a port in fluid communication with said center opening exteriorly of said wrist pin; a connecting rod journalled on said wrist pin at a location to surround said port, said connecting rod including an elongated conduit in fluid communication with said port; a compression ring disposed within said groove to be carried by said piston in sealing engagement with said cylinder, said compression ring including means defining an elongated peripheral fluid flow path having an inlet and an outlet peripherally spaced along said flow path; means defining a fluid conduit in said piston having one end opening to a side of said groove to be in fluid communication with said inlet and another end in fluid communication with said wrist pin center; means defining a second fluid flow conduit in said piston having one end in fluid communication with said outlet and another end opening to an exterior surface of said piston; whereby a coolant may be directed through said connecting rod, said wrist pin and said piston to said fluid flow path to cool said ring during engine operation; and spring means biasing said compression ring against said side.

* * * * *

UNITED STATES PATENT AND TRADEMARK OFFICE
CERTIFICATE OF CORRECTION

PATENT NO. : 4,026,197
DATED : May 31, 1977
INVENTOR(S) : Robert A. Lapke and Bernard G. Richards It is certified that error appears in the above-identified patent and that said Letters Patent are hereby corrected as shown below:

Column 3, line 68, "to" should read --of--.

Column 4, line 45, "said" should read --and--;

Signed and Sealed this

Fourth Day of October 1977

[SEAL]

Attest:

RUTH C. MASON
Attesting Officer

LUTRELLE F. PARKER
Acting Commissioner of Patents and Trademark